(No Model.)
J. J. PIATT.
UPRIGHT BEATER BALING PRESS.
No. 315,960. Patented Apr. 14, 1885.
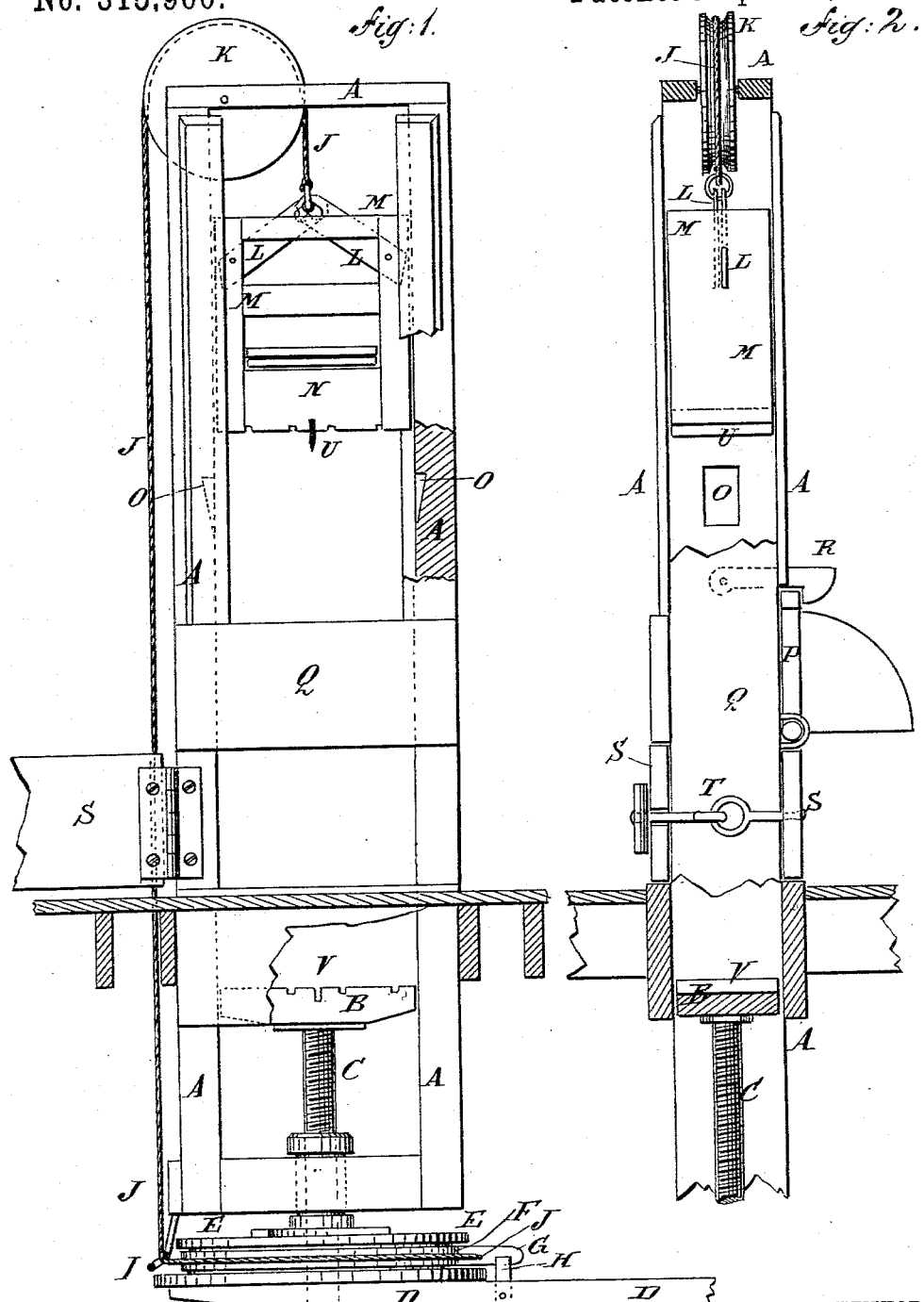
WITNESSES:
INVENTOR:
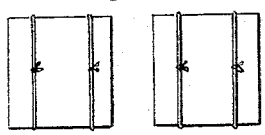
BY
ATTORNEYS.

UNITED STATES PATENT OFFICE.

JOHN J. PIATT, OF RISING SUN, INDIANA.

UPRIGHT-BEATER BALING-PRESS.

SPECIFICATION forming part of Letters Patent No. 315,960, dated April 14, 1885.

Application filed February 26, 1885. (No model.)

*To all whom it may concern:*

Be it known that I, JOHN J. PIATT, a resident of Rising Sun, in the county of Ohio and State of Indiana, have invented a new and useful Improvement in Upright-Beater Baling-Presses, of which the following is a full, clear, and exact description.

Reference is to be had to the accompanying drawings, forming a part of this specification, in which similar letters of reference indicate corresponding parts in all the figures.

Figure 1 is a rear elevation, partly in section and parts being broken away, of an upright-beater baling-press to which my improvement has been applied. Fig. 2 is a side elevation of the same, partly in section and parts being broken away. Fig. 3 represents two small bales as formed by the use of my improvement.

The object of this invention is to improve the construction of upright-beater baling-presses in such a manner that two or more small bales can be formed in the press at the same time and without any increase of labor, instead of the single large bale heretofore formed in such presses.

The invention relates to an upright-beater baling-press constructed with one or more knives attached to the beater, to cut each feed into two or more parts as it is compressed by the beater, and thus form two or more small bales at one operation. The follower is made with one or more grooves to receive the knife or knives of the beater and prevent the said follower and knife or knives from being injured, as will be hereinafter fully described, and then claimed.

A represents the frame of an upright-beater baling-press. B is the follower, which is operated by the screw C. Motion is given to the screw C by means of the sweep D, to which is attached a grooved wheel, E. In the groove of the wheel E is placed a band, F, which is made with a projecting arm, G. The arm G engages with a button, H, or other catch attached to the sweep D, so that the band F will be carried around by the wheel E. At each revolution of the wheel E the arm G is released from the button H by the guide-eye I, a pulley, or other suitable means. To the arm G is attached the end of the rope J, which passes through the guide-eye I or around a guide-pulley, passes up at the side of the press, and passes over a guide-pulley, K, journaled to the top of the press-frame A, and which is made of such a size that the rope J will pass down through the center of the press, where its end is attached to the inner ends of the two links L, which are pivoted near their outer ends to the frame M, that carries the beater N, and causes the said beater to move up and down squarely and without binding. When the beater N drops to compress a feed, the outer ends of the links L enter recesses O in the frame A and lock the said beater against being forced upward by any pressure applied to it. The ends of the links L are withdrawn from the recesses O by a draft-strain upon the hoisting-rope J, so that the said beater will be raised freely. This construction adapts the beater N to serve as a head-block to resist the pressure when the follower B is forced upward to compress a bale, and at the same time does not affect its operation as a beater.

P is the door which closes the opening through which the hay or other material is fed into the baling-box Q, and which, when turned down, serves as a feed-apron. The door P is held in place, when closed, by a hook, R, or other suitable means.

S are the doors through which the bales are removed, and which are hinged at one end to the frame A, and are held at the other end by a jointed locking-bar, T, or other suitable means.

As thus far described there is nothing new in the construction.

To the lower side or face of the beater N are secured one or more knives, U, of a length equal to the breadth of the said beater N, and of such a width as to cut through each feed as it is compressed by the beater, so that two or more small bales will be formed, instead of one large bale, as in other presses.

In the face of the follower B, directly beneath the knife or knives U of the beater N, are formed one or more grooves, V, according to the number of knives U used, which grooves are made of sufficient depth to receive the said knives when the first feed of a bale is being compressed, and thus prevent the said follower from being injured by the said knives, and the said knives from being dulled or injured by contact with the said follower.

I have shown and described my improvement as being applied to a screw-operated upright-beater press, but do not limit myself to that use, as it can also be applied with equal advantage to lever-operated presses and to other styles of upright-beater presses.

Having thus fully described my invention, I claim as new and desire to secure by Letters Patent—

1. In an upright-beater baling-press, the combination, with the beater N, of one or more knives, U, substantially as herein shown and described, whereby each feed, as it is compressed by the beater, will be cut into two or more parts, so as to form two or more small bales at one operation, as set forth.

2. In an upright-beater baling-press, the follower B, made, substantially as herein shown and described, with one or more grooves, V, to receive the knife or knives of the beater, whereby the said follower and knives are prevented from being injured, as set forth.

JOHN J. PIATT.

Witnesses:
SAMUEL REED DOWNEY,
GEORGE I. MOORE.